United States Patent
Thompson

[11] Patent Number: 5,727,820
[45] Date of Patent: Mar. 17, 1998

[54] SIDE-MOUNTED "L" SHAPED FLANGE

[76] Inventor: David M. Thompson, 802 Mantoloking Rd., Brick Town, N.J. 08723

[21] Appl. No.: 692,097

[22] Filed: Aug. 7, 1996

[51] Int. Cl.$^6$ .............. F16L 39/00; B63B 13/00
[52] U.S. Cl. .............. 285/139.2; 114/197; 285/207; 285/206; 220/DIG. 6
[58] Field of Search .............. 285/128, 161, 285/150, 205, 206, 207, 208, 209; 114/197, 183 R; 4/323; 141/86, 311 A; 220/DIG. 6, 661, 601; 184/1.5, 106; 411/169, 973, 400, 401, 435, 427

[56] References Cited

U.S. PATENT DOCUMENTS

| 164,846 | 6/1875 | Latham | 411/973 |
|---|---|---|---|
| 194,336 | 8/1877 | Denniston | 285/209 |
| 322,155 | 7/1885 | Brandt | 411/169 |
| 2,535,159 | 12/1950 | Rhinehart | 785/207 |
| 2,972,002 | 2/1961 | Wayman | 285/161 |
| 3,217,685 | 11/1965 | Mueller | 114/197 |
| 3,475,772 | 11/1969 | Lokken | 114/183 R |
| 3,565,031 | 2/1971 | Depersia | 114/197 |
| 4,217,846 | 8/1980 | Wight | 114/197 |
| 4,492,392 | 1/1985 | Woods et al. | 285/205 |
| 4,820,096 | 4/1989 | Knight | 411/169 |
| 4,875,884 | 10/1989 | Weisenburg | 114/197 |
| 5,456,499 | 10/1995 | Sharpe | 285/206 |

FOREIGN PATENT DOCUMENTS

| 138627 | 12/1952 | Sweden | 114/197 |
|---|---|---|---|
| 498411 | 1/1939 | United Kingdom | 285/128 |

*Primary Examiner*—Eric K. Nicholson
*Attorney, Agent, or Firm*—Charles F. Gunderson

[57] ABSTRACT

A flange for a drain pipe extending from the side of a large, flat-bottomed, open container, such as the cockpit of a boat, has its upper portion fitted along the inside of the side of the cockpit, but the lower portion of the flange is bent inwards along the bottom of the drain pipe in an "L" shape to rest tightly against the bottom or deck of the cockpit, which brings the bottom of the drain pipe close to the deck of the cockpit, to drain off as much as possible of the water that builds up in the cockpit due to rain, spray, or other sources.

4 Claims, 1 Drawing Sheet

SIDE-MOUNTED "L" SHAPED FLANGE

BACKGROUND OF THE INVENTION

There are very many types of containers, of innumerable sizes and shapes, that hold or collect liquids, and some of these must be emptied or drained, ocassionally or continually. Many of these have flat bottoms and vertical sides. Some of these, from kitchen sinks to boat cockpits, are open and exposed to water from any source, including rain or even spray. In many cases they must be drained at all times.

Larger containers or units with fixed mountings must have built in drains. If the drains can be connected through the flat bottom, the drains can have simple drain pipes with circular flanges surrounding and holding the drain pipe, to permit gaskets or other sealing mechanism to make it watertight.

However, in many cases it is impossible or impractical, mechanically, to drain through the flat bottom, and drains must be made through the sides of the units, as close as possible to the flat bottom. Here the necessary flange, which is usually circular and must be of a larger diameter than the drain pipe and its hole, to support and seal it, pushes the drain pipe well above the level of the flat bottom, and limits the drainage. This can be undesirable in certain situations, such as the cockpits of small boats that are subject to rain and spray and must be walked through constantly, and must be drained as much and as quickly as possible.

Actually, almost all boats, over a certain size, have separate cockpits; above the bottom of the hull itself but fitted within the hull. These are designed to provide a usable area, with comfortable seating and a flat bottom or deck area to walk on, which is not always possible within the contours of the hull itself. This cockpit is usually open, and exposed to rain, spray, or water from any source, as noted, and there must be be some means for bailing or draining it as much as possible to keep it usuable.

If the floor or deck of the cockpit is above the actual waterline of the hull, and well above the bottom of the hull, a drain in the deck of the cockpit would be the simplest solution. This would let the water drain out from the deck of the cockpit to the sea. Many of these are in use, and if there is enough space between the deck and the hull, the cockpit deck drain could be coupled to a scupper through the side of the hull or transom, above the water line, to carry out all of the water. However, particularly in smaller boats, there is not always enough room between the floor or deck of the cockpit and the hull to physically mount such drains, or maintain and repair them.

Here, as noted, the simpler, and more accessible cockpit drain would be through the side of the cockpit wall and to the hull. Such a cockpit drain unit would usually be coupled by a flexible hose to a scupper unit through the hull. This would usually be through the transom, since it is the least subject to wave action, and is usually well above water level when the boat is in motion or planing.

However, all of the side-mounted drain coupling units must still have a flange to secure the inner end of the drain tube to the inner side wall at the bottom of the cockpit, and to secure the necessary gasket or gasket compound between the the flange and the side of the cockpit to prevent leakage into the bilge. With a conventional, flat, circular flange and gasket, this, necessarily, raises the tube of the drain unit, substantially above the floor or the deck of the cockpit to leave a substantial level of water undrainable from the cockpit.

OBJECTS OF THE INVENTION

It is therefore an object of this invention to provide a side-mounted drain for a liquid container unit with a flat bottom. The necessary flange on the inside of the container has a flat vertical top portion that fits against the side wall, but its bottom portion forms an "L"shaped lower part of the flange that rests close to the bottom and brings the drain pipe as close as possible to the level of the bottom of the container to drain off as much as possible of the water in the container unit. This could be, for example, the cockpit of a boat.

SUMMARY OF THE INVENTION

A flange for a drain pipe extending from the side of a large open container unit, such as the cockpit of a boat, has its lower part or portion bent inwards into an "L" shape to rest on the bottom or deck of the cockpit and bring the drain pipe as close as possible to the deck to drain off as much as possible of the water that builds up in the cockpit due to rain or spray, for example.

DETAILED DESCRIPTION OF THE DRAWINGS

Figure 1:
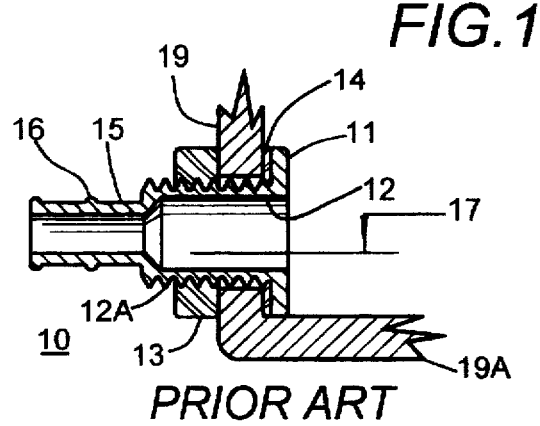
FIG. 1 is a side view of a prior-art, side-mounted cockpit drain with its flange and pipe in cross section.

FIG. 1 shows a typical side-mounted cockpit drain 10, of a type well known in the prior art. This is all shown in cross section to illustrate that a conventional, circular flange 11 raises the drain opening, of an output drain pipe 12, extending through a side wall 19 of a cockpit, substantially above the level of a floor or deck 19A, and to show that the water level 17 must be held to the height of the lower inner portion of the drain pipe 12. FIG. 1 also shows a gasket 14 and other details of its mounting. This flange is attached to the inner end of the drain pipe 12 that would be threaded on its outside 12A to accomodate a nut 13 that draws the circular flange 11 against the gasket 14 and the inside of the side wall 19 of the cockpit.

Figure 4:
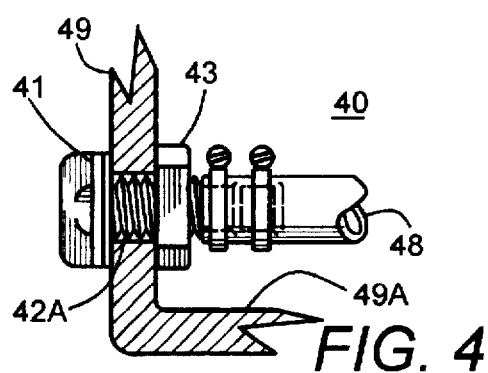
FIG. 4 is a side view of a hull-mounted scupper coupled to a similar drain hose, partly in cross section.
Figure 3:
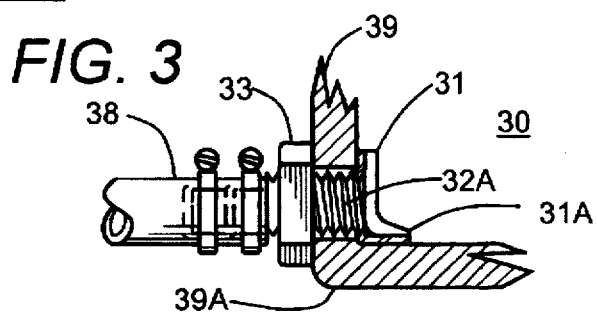
FIG. 3 is a side view of an "L" shaped flange cockpit drain coupled to a drain hose, partly in cross section.

The other end of the drain pipe 12 forms a coupling tube 15 for a hose (not shown) to provide a flexible coupling to any other device to take the water out of the cockpit. The coupling tube 15 may be smaller, to accomodate a standard hose (not shown), and would have ridges or barbs such as 16 to secure the hose when tightly clamped, as seen in FIGS. 3 and 4. This standard hose coupling 15 would normally be concentric with the drain tube 12, and, if of a smaller diameter, would raise the water level of the actual drain still higher.

Figure 2:
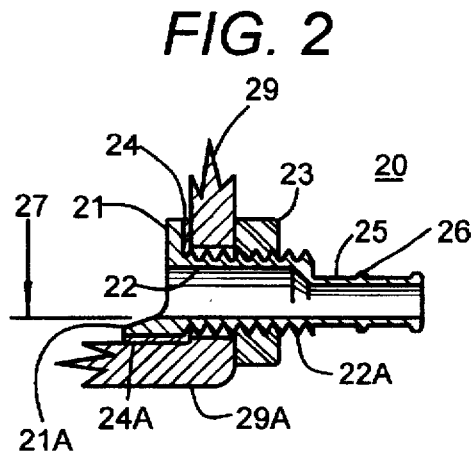
FIG. 2 is a side view of an "L" shaped flange, side-mounted cockpit drain in cross section.

FIG. 2 is a cross section of an "L" shaped flange cockpit drain 20, at the same scale as that of the conventional drain of FIG. 1, and, again, mounted in the side wall of a cockpit. However, this flange is shown in reverse direction to clearly show the considerably-lower water level 27 obtainable. Here a flange 21 is again coupled to a drain pipe 22 that would also have a threaded outer portion 22A to accomodate a nut 23 that holds the device in place against the inside of the side wall 29 of the cockpit.

Here the lower portion 21A of the flange is bent out in an "L" shape to lower the drain pipe 22 very close to the floor or deck 29A of the cockpit, as shown. A gasket 24 would have a lower portion 24A that is also bent under the lower portion 21A of the flange to seal this cockpit drain.

In this special drain unit, an outer extension 25 for a hose-coupling tube, which may also be of a smaller diameter, is also lowered to the level of the bottom of the tube 22 to further keep the drainage openings at the lowest possible level. This outer hose-coupling tube extension 25 may also have ridges or barbs such as 26 to secure a drain hose (not shown, but as seen in FIGS. 3 and 4) to a cockpit drain outlet.

The minimum water level that can be had with the conventional flange coupling mounted to the side of cockpit wall is seen at 17 in FIG. 1, and must be very much higher than the minimum water level 27 that can be achieved by the "L" shaped flange device of FIG. 2.

FIG. 3 shows a cockpit drain 30, partially in cross section, of the type shown in FIG. 2. This shows more clearly how it extends through a side 39 of a cockpit at the level of the floor or deck 39A of the cockpit, in a position for a hose 38 to be connected to the hull outlet fitting of FIG. 4, for example. In this figure, the device has a flange 31 fitting along the inside of the side 39 of the cockpit, with its bottom 31A, in close contact with the floor or deck portion 39A, forming an "L" shape with the flange 31. A threaded portion 32A of the the drain pipe is seen with a nut 33 drawing the flange tightly against the inner wall of the side 39 of the cockpit and its deck 39A.

FIG. 4 shows a hull fitting or scupper 40, extending through the side or transom 49 of a hull, to carry out water from a source inside the hull, such as the cockpit drain, seen in FIG. 3. This consists of a conventional circular flange 41, at one end of a threaded tube 42A, that is drawn against the outside of the hull 49 by a nut 43. A hose 48 is clamped onto the inner end of the threaded tube to be coupled, as noted, to a source of water to be drained. A this scupper would be above the water line, and above the bottom 49A of the transom or side of the hull.

It shoud be noted that scupper flappers, or flap valves, or back-flow stoppers should be included in the scuppper 40, if not somewhere in the cockpit drain pipes of any of these drains, to keep sea water from flowing back into the cockpit and hull, in the event of wave action or the like. These flap valves are standard and conventional.

It should also be noted that, while gaskets are standard and readily available to fit under conventional flanges, they could be replaced, particularly in these "L" shaped drain flanges, with gasket compounds that would seal the flanges to the sides and bottoms of the cockpits more closely, and probably more tightly. In any case a seal is necessary, even if the pressure of a fraction of an inch of water is negligible.

Figure 5:
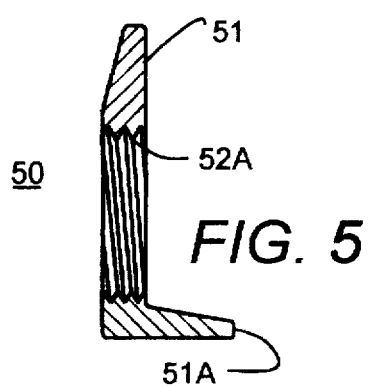
FIG. 5 is a side view of an "L" shaped flange nut in cross section.

FIG. 5 shows a side view of an "L" shaped flange 50, similar to that of FIGS. 2 and 3, in the form of a nut. Here the upper part of a flange 51, similar to 31, can rest against the side wall of a container (not shown), similar to 39 of FIG. 3. The lower part 51A of the flange, similar that of 21A, and 31A, can rest against the bottom or deck of the container. A threaded end of a pipe or nipple (not shown) can be screwed to the "L" shape flange nut, extending through the side of the container, with an additional standard nut (not shown) securing the other side.

Figure 6:
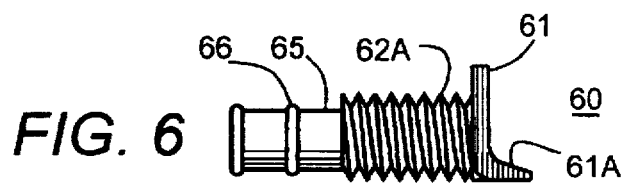
FIG. 6 is a side view of the "L" shaped flange cockpit drain.

FIG. 6 is a side view of an "L" shaped flange 60 as shown in FIG. 3. Here, the upper part of a flange 61 goes down to an "L" shaped lower part 61A at the inner end of a drain tube, with threading 62A for a nut (not shown). The outer end of the drain tube joins in a hose coupling extension 65 with its barbs, such as 66. This, again, if of smaller diameter, may be lowered to the level of the drain tube, as noted above, and shown, to maintain the lowest possible waterlevel to drain the cockpit.

Figure 7:
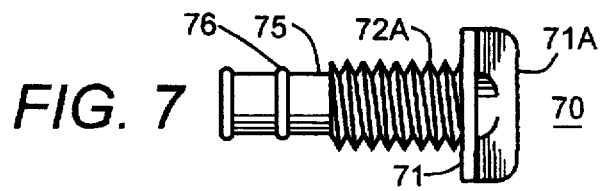
FIG. 7 is a top view of the "L" shaped flange cockpit drain.

FIG. 7 is a top view of the same "L" shaped flange 70, with its top section 71 and an "L" shaped portion 71A at the end of a threaded pipe 72A, as described in FIG. 6, joining a hose coupling extension 75, with its barbs, such as 76

Figure 8:
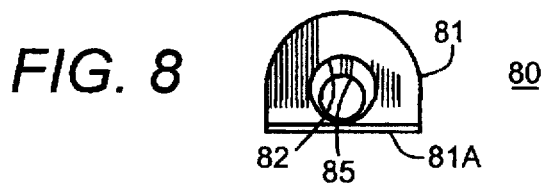
FIG. 8 is a front view of the "L" shaped flange cockpit drain.

FIG. 8 is a front view of the same "L" shaped flange 80, showing its top portion 81, and an "L" shaped portion 81A, looking into a drain pipe 82, and the inside of a smaller diameter hose coupling 85.

These "L" shaped flanges may be formed of metal, or of molded plastic, with or without an integral, threaded drain pipe.

I claim:

1. A side-mounted drain for emptying a flat bottomed container comprising; an "L" shaped flange fitted to a lower side of a container; said flange having a substantially vertical upper portion for fitting along the the inside of the side of said container, and a substantially horizontal lower portion, forming an "L" shape with respect to said upper portion, fitted along the inside of the flat bottom of a container; a drain tube having an under side coupled to the outside of said flange at the level of said lower portion, whereby any liquids in said container can be drained to the lower level of said flange; means for securing said flange and said drain tube to said side of said container; and a gasket in the shape of said "L" shaped flange, fitted between said flange and said side wall and said flat bottom to prevent leakage.

2. A side-mounted drain, as in claim 1, wherein said "L" shaped flange has a central circular opening that is threaded to act as a nut, and said drain tube is threaded to fit through said said of said container and into said threaded flange, as well as accomodating another nut on the outside of said container, as said means for securing said flange and said drain tube to said side of said container.

3. A side-mounted drain, as in claim 1, in combination with a flat bottom container, wherein said flat bottomed container is an open cockpit of a boat that is subject to rain and spray that must be constantly drained as completely as possible; said flat bottom of said open cockpit being above the water line of said boat.

4. A side-mounted drain, as in claim 3, wherein said drain tube is coupled to a scupper through the side of the hull of said boat above, its water line.

* * * * *